United States Patent
Aoyama

(10) Patent No.: US 6,529,163 B2
(45) Date of Patent: Mar. 4, 2003

(54) ARRAY ANTENNA RADIO COMMUNICATION APPARATUS AND ARRAY ANTENNA RADIO COMMUNICATION METHOD

(75) Inventor: Takahisa Aoyama, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/959,375

(22) PCT Filed: Feb. 23, 2001

(86) PCT No.: PCT/JP01/01336

§ 371 (c)(1),
(2), (4) Date: Oct. 24, 2001

(87) PCT Pub. No.: WO01/63799

PCT Pub. Date: Aug. 30, 2001

(65) Prior Publication Data

US 2002/0158800 A1 Oct. 31, 2002

(30) Foreign Application Priority Data

Feb. 25, 2000 (JP) ........................................ 2000-049853

(51) Int. Cl.[7] .................................................. G01S 3/16
(52) U.S. Cl. ...................................................... 342/378
(58) Field of Search ................................... 342/378, 382

(56) References Cited

U.S. PATENT DOCUMENTS 4,717,919 A  *  1/1988  Cherrette et al. ........... 342/378
6,091,361 A  *  7/2000  Davis et al. ................. 342/195

* cited by examiner

Primary Examiner—Gregory C. Issing
(74) Attorney, Agent, or Firm—Stevens, Davis, Miller & Mosher, LLP

(57) ABSTRACT

A radio section(RS) 102 receives, through antennas 101-1 through 101-3, a plurality of signals transmitted on a plurality of channels from a communication partner; demodulation sections(DS) 103-1 through 103-3 despread the signals of the channels; reception weight generation sections (RWGS) 104-1 through 104-3 generate reception weights 1 through 3 for the signals of the channels; respectively; a common weight generation section 105 generates, from the reception weights 1 through 3, a common reception weight, by which each of the signals of the channels is commonly multiplied; and multipliers 106-1 through 106-3 multiply each of the signals of the channels by the common reception weight. Thereby, the array antenna radio communication apparatus receives all of the signals of the channels with the same directional pattern.

9 Claims, 3 Drawing Sheets

ARRAY ANTENNA RADIO COMMUNICATION APPARATUS AND ARRAY ANTENNA RADIO COMMUNICATION METHOD

TECHNICAL FIELD

The present invention relates to an array antenna radio communication apparatus and an array antenna radio communication method.

BACKGROUND ART

In a radio communication system of CDMA (Code Division Multiple Access) method, interference among various kinds of signals causes deterioration of characteristics of signals which receiving sides receive, as a plurality of communication partners transmit signals in the same frequency band.

An array antenna radio communication apparatus has been known as an apparatus for suppression of the above interference. The array antenna radio communication apparatus is a radio communication apparatus which is provided with a plurality of antennas, and may freely set directivity by adjusting each amplitude and phase of signals received at each antenna.

The array antenna radio communication apparatus adjusts the amplitude and phase of the received signals by multiplying the received signals by a weight factor (hereinafter, called as "weight"). The array antenna radio communication apparatus may intensely receive only signals incoming from a desired direction by adjusting the multiplying weight.

Here, multi-code transmission is sometimes used for improving a transmission rate in a mobile communication system of the CDMA method. In the mobile communication system of the CDMA method, there are some cases where desired transmission rate is not obtained on one communication channel in the case of a large amount of data, for example, when image data and voice data are required to be transmitted at the same time, as there is an upper limit in the transmission rate for one communication channel.

Then, multi-code transmission, where spread of image data and voice data is performed with different spreading codes, respectively, and, at the same time, a plurality of communication channels are used for simultaneous transmission of the image data and the voice data, is used. As described above, desired transmission rate may be obtained even in the case of large amounts of data, as data is transmitted, using a plurality of communication channels at the same time in the multi-code transmission.

However, there is a following problem, when a conventional array antenna radio communication apparatus is applied for the CDMA radio communication system in which the multi-code transmission is performed.

That is, the array antenna radio communication apparatus obtains reception weights respectively for demodulation data obtained after despreading of the received signals with a plurality of different spreading codes in the case where the multi-code transmission is performed. All the reception weights obtained as described above are obtained from a signal transmitted from one communication partner. Therefore, all the reception weights naturally have the same value, by which the directivity is formed in the direction of a position where the communication end is located.

However, a plurality of reception weights sometimes have the different value, respectively, as there are caused different errors respectively in a plurality of reception weights by noise, differences in power among signals of each channel, differences in correlation values depending on the difference in the spreading codes, and so on.

Disclosure of Invention

An object of the present invention is to provide an array antenna radio communication apparatus and an array antenna radio communication method, capable of improving a reception quality by setting values of the reception weights for a plurality of signals transmitted from the same direction on a plurality of channels to the same value.

In order to achieve the above object, in the present invention, the same directional pattern is formed for all signals transmitted from the same direction by setting values of reception weights for a plurality of signals, which are transmitted on a plurality of channels from the same direction, to a value of an accurate reception weight. Thereby, the reception quality may be improved.

BEST MODE FOR CARRYING OUT THE INVENTION

Figure 1:
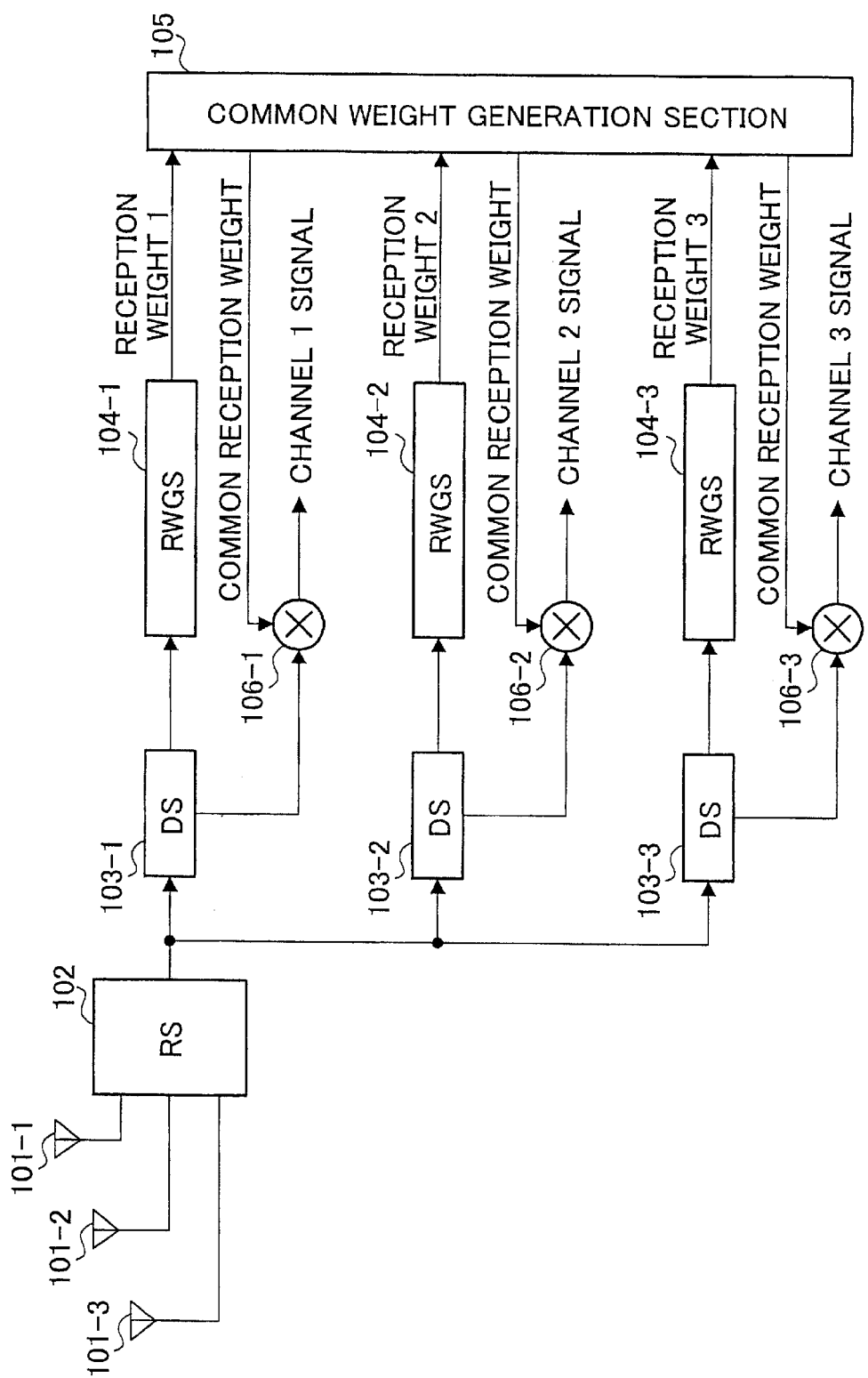
FIG. 1 is a block diagram showing a schematic configuration of an array antenna radio communication apparatus according to a first embodiment of the present invention.

Hereinafter, embodiments of the present invention will be described in detail, referring to the drawings.

FIRST EMBODIMENT

In an array antenna radio communication apparatus and an array antenna radio communication method according to the present embodiment, reception weights, which are generated for respective signals of all channels subjected to multi-code transmission, are combined, and the combined reception weight is used as reception weights for the signals of all the channels, whereby the reception weights for respective signals of channel are set to a reception weight with high accuracy.

FIG. 1 is a block diagram showing a schematic configuration of an array antenna radio communication apparatus according to the first embodiment of the present invention.

In addition, the following description will be made as one example, assuming that the number of array antennas is three. Further, a case will be described where one communication partner performs multi-code transmission of three signals spread with different spreading codes 1 through 3, respectively, using channels 1 through 3, as one example in the following description. Further more, it is assumed that a signal, which is transmitted on channel 1, and spread with spreading code 1, is called as "channel 1 signal"; the one transmitted on channel 2 and spread with spreading code 2 is called as "channel 2 signal"; and the one transmitted on channel 3 and spread with spreading code 3 is called as "channel 3 signal".

In FIG. 1, a radio section(RS) 102 performs predetermined radio processing of signals received through antennas 101-1 through 101-3. Here, the received signals are signals including a channel 1 signal, a channel 2 signal, and a channel 3 signal, as they are signals subjected to multi-code transmission.

Demodulation sections(DS) 103-1 through 103-3 perform predetermined demodulation processing by multiplying the received signals by different spreading codes 1 through 3, respectively. Reception weight generation sections(RWGS) 104-1 through 104-3 generate reception weights 1 through 3 by performing adaptive signal processing on demodulated channel 1 signal through demodulated channel 3 signal.

A common weight generation section 105 generates one reception weight, which is commonly used for multiplication of the channel 1 signal through the channel 3 signal, using three reception weights 1 through 3 generated in the reception weight generation sections(RWGS) 104-1 through 104-3. In addition, the reception weight generated in the common weight generation section 105 is called as "common reception weight" in the following description.

Multipliers 106-1 through 106-3 multiply the channel 1 signal through the channel 3 signal by the common reception weight, respectively.

Then, operations of the array antenna radio communication apparatus with the above configuration will be described.

The signals received through antennas 101-1 through 101-3 are subjected to predetermined radio processing in the radio section(RS) 102 and then output to the demodulation sections(DS) 103-1 through 103-3. The received signals are multiplied by different spreading codes 1 through 3, respectively, and are subjected to predetermined demodulation processing in the demodulation sections(DS) 103-1 through 103-3. Thereby, the channel 1 signal through the channel 3 signal are obtained, respectively.

The channel 1 signal demodulated in the demodulation section(DS) 103-1 is output to the reception weight generation section(RWGS) 104-1and the multipliers 106-1. Similarly, the channel 2 signal demodulated in the demodulation section(DS) 103-2 is output to the reception weight generation section(RWGS) 104-2 and the multipliers 106-2, and the channel 3 signal demodulated in the demodulation section(DS) 103-3 is output to the reception weight generation section(RWGS) 104-3 and the multipliers 106-3.

The reception weight generation sections(RWGS) 104-1 through 104-3 perform the adaptive signal processing on the channel 1 signal through the channel 3 signal, and thereby generate the reception weights 1 through 3, respectively. The generated reception weights 1 through 3 are output to the common weight generation section 105, respectively.

In addition, there is no limitation on the method for generation of the reception weights. Examples used as a method for generating reception weights include a method (beam steering) for generating such reception weights that form a radiation pattern with a beam pointed in the direction of arrival of a desired signal, and a method (null steering) for generating such reception weights that form a radiation pattern with a null point pointed in the direction of arrival of an interfering signal.

Here, the reception weights 1 through 3 sometimes have different values, respectively, as there are caused different errors respectively in the reception weights 1 through 3 by noise; differences in power among the channel 1 signal through the channel 3 signal; differences in correlation values caused by the difference in the spreading codes for spread of the channel 1 signal through the channel 3 signal; and so on.

Then, the common weight generation section 105 generates the common reception weight by combining the reception weights 1 through 3. The reception weight obtained by combining the reception weights 1 through 3 is used as the common reception weight, whereby the accuracy of the reception weight to be multiplied by the channel 1 signal through the channel 3 signal is improved. The generated common reception weight is output to multipliers 106-1 through 106-3.

There is no limitation on a method for combining the reception weights 1 through 3. For example, there is a method for averaging values of the reception weights 1 through 3 and using the obtained average value as the common reception weight.

Array combining is performed by multiplication of the channel 1 signal through the channel 3 signal by the common reception weight in the multipliers 106-1 through 106-3. Thereby, the array antenna radio communication apparatus according to the present embodiment is capable of receiving the channel 1 signal through the channel 3 signal with the same directional pattern has been formed for the channel 1 signal through the channel 3 signal.

Thus, according to the array antenna radio communication apparatus and the array antenna radio communication method, reception weights generated for respective signals of all channels subjected to multi-code transmission are combined, and the combined reception weight is used as a reception weight for each of the signals of all the channels, whereby the reception weights for the signals of all the channels are set to the reception weight with high accuracy. Therefore, since it is possible to receive respective signals of channels subjected to multi-code transmission using the same radiation pattern with high accuracy, it is possible to improve the reception quality.

SECOND EMBODIMENT

Figure 2:
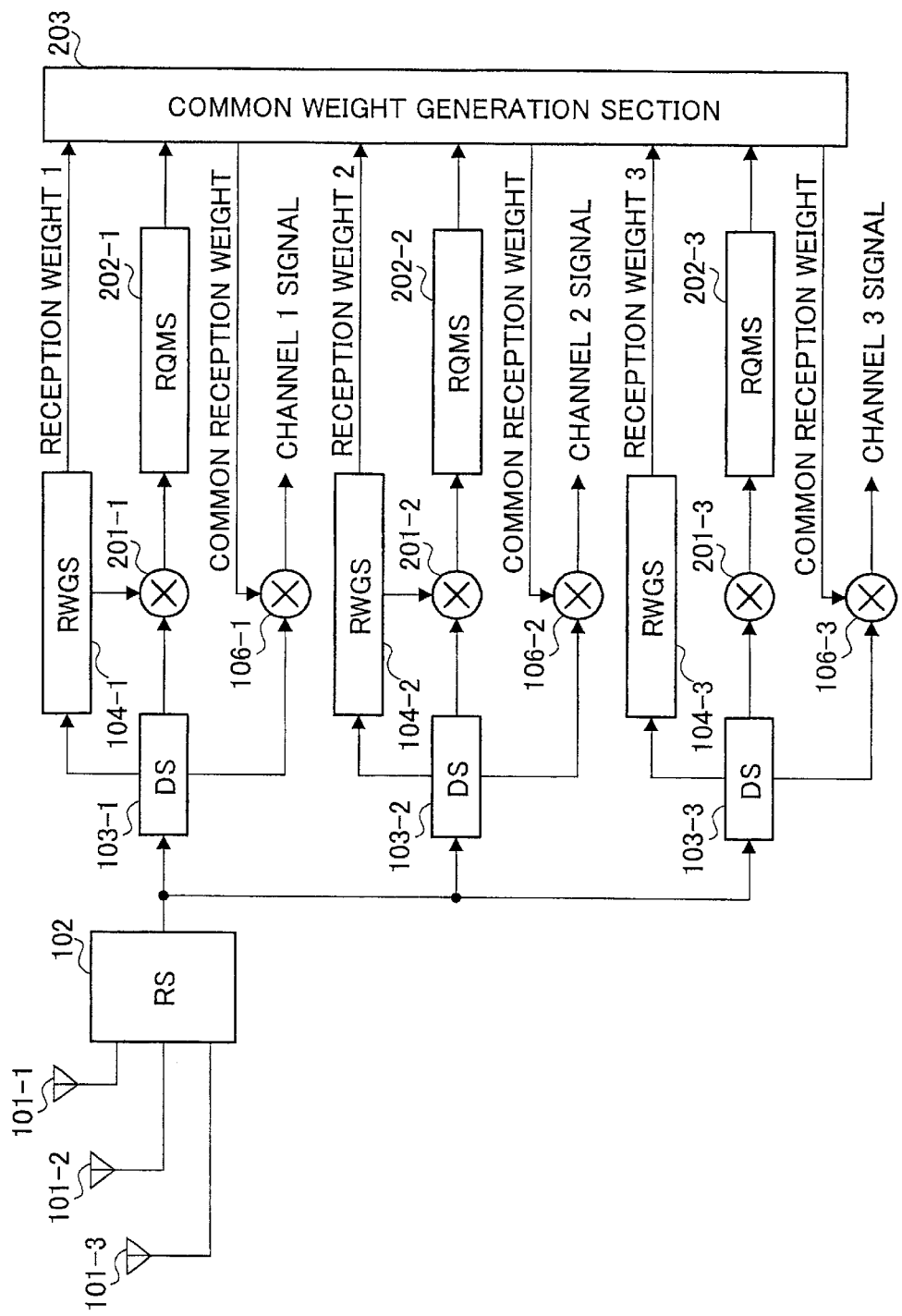
FIG. 2 is a block diagram showing a schematic configuration of an array antenna radio communication apparatus according to a second embodiment of the present invention.

The present embodiment and the first one are different in generating a common reception weight according to the reception qualities of respective signals of channel subjected to multi-code transmission. FIG. 2 is a block diagram showing a schematic configuration of an array antenna radio communication apparatus according to the second embodiment of the present invention. Here, parts similar to those of the first embodiment are denoted by the same reference numbers, and detailed description will be eliminated.

Multipliers 201-1 through 201-3 multiply the channel 1 signal through the channel 3 signal by reception weights 1 through 3 generated in reception weight generation sections (RWGS) 104-1 through 104-3, respectively.

A reception quality measurement section(RQMS) 202-1 measures the reception quality of the channel 1 signal multiplied by the reception weight 1 in the multiplier 201-1. Similarly, a reception quality measurement section(RQMS) 202-2 measures the reception quality of the channel 2 signal multiplied by the reception weight 2 in the multiplier 201-2, and a reception quality measurement section(RQMS) 202-3 measures the reception quality of the channel 13 signal multiplied by the reception weight 3 in the multiplier 201-3. Thereby, the reception qualities at the directivity corresponding to the channel 1 signal through the channel 3 signal are measured, respectively. Here, there is no limitation on values indicating the reception qualities. For example, correlation values, reception SIRs (Signal to Interference Ratios), and so on may be used as the above values.

A common weight generation section 203 uses a reception weight with the best reception quality among the reception weights 1 through 3 as the common reception weight.

Subsequently, operations of the array antenna radio communication apparatus with the above configuration will be described.

The channel 1 signal demodulated in the demodulation section(DS) 103-1 is output to the reception weight generation section(RWGS) 104-1, the multiplier 106-1, and the multiplier 201-1. Similarly, the channel 12 signal demodulated in the demodulation section(DS) 103-2 is output to the reception weight generation section(RWGS) 104-2, the multiplier 106-2, and the multiplier 201-2, and the channel 3 signal demodulated in the demodulation section(DS) 103-3 is output to the reception weight generation section(RWGS) 104-3, the multiplier 106-3, and the multiplier 201-3.

The reception weight generation sections(RWGS) 104-1 through 104-3 perform the adaptive signal processing on the channel 1 signal through the channel 3 signal, and thereby generate the reception weights 1 through 3, respectively. The generated reception weights 1 through 3 are output to the multipliers 201-1 through 201-3 and the common weight generation section 203, respectively.

In the multipliers 201-1 through 201-3, the channel 1 signal through the channel 3 signal are multiplied by the reception weights 1 through 3, respectively. Thereby, directional patterns corresponding to the channel 1 signal through the channel 3 signal are formed, respectively. The channel 1 signal through the channel 3 signal, which are received under a state where the directional patterns have been formed, are output to reception quality measurement sections(RQMS) 202-1 through 202-3, respectively.

In the reception quality measurement sections(RQMS) 202-1 through 202-3, the reception qualities at the directivity corresponding to the channel 1 signal through the channel 3 signal are measured, respectively. The values indicating the measured reception qualities are output to the common weight generation section 203, respectively.

Here, it may be said that a directional pattern formed with the reception weight having the best reception quality among the reception weights 1 through 3 is the best directional pattern for all of the channel 1 signal through the channel 3 signal. In other words, all the reception qualities of the channel 1 signal through the channel 3 signal become the best reception quality, when all of the channel 1 signal through the channel 3 signal are received with a directional pattern formed with a reception weight having the best reception quality among the reception weights 1 through 3. Then, the common weight generation section 203 outputs a reception weight with the best reception quality among the reception weights 1 through 3 as a common reception weight to the multipliers 106-1 through 106-3.

Array combining is performed by multiplication of the channel 1 signal through the channel 3 signal by the common reception weight in the multipliers 106-1 through 106-3.

Here, it may be configured in the present embodiment that the common weight generation section 203 generates the common reception weight by combining of the reception weights 1 through 3 after weighting of the reception weights 1 through 3 according to the size of the values indicating the reception qualities. Specifically, it may be configured that the average value of the reception weights 1 through 3, weighting of which the common weight generation section 203 performs according to the size of the values indicating the reception qualities, is used as the common reception weight.

Thus, according to the array antenna radio communication apparatus and the array antenna radio communication method, the common reception weight is generated according to the reception qualities of respective signals of channel subjected to multi-code transmission. Therefore, it is possible to further improve the accuracy of the directional pattern and the reception quality compared with those of the first embodiment.

THIRD EMBODIMENT

The present embodiment and the first one are different in generating a transmission weight using a common reception weight.

Figure 3:
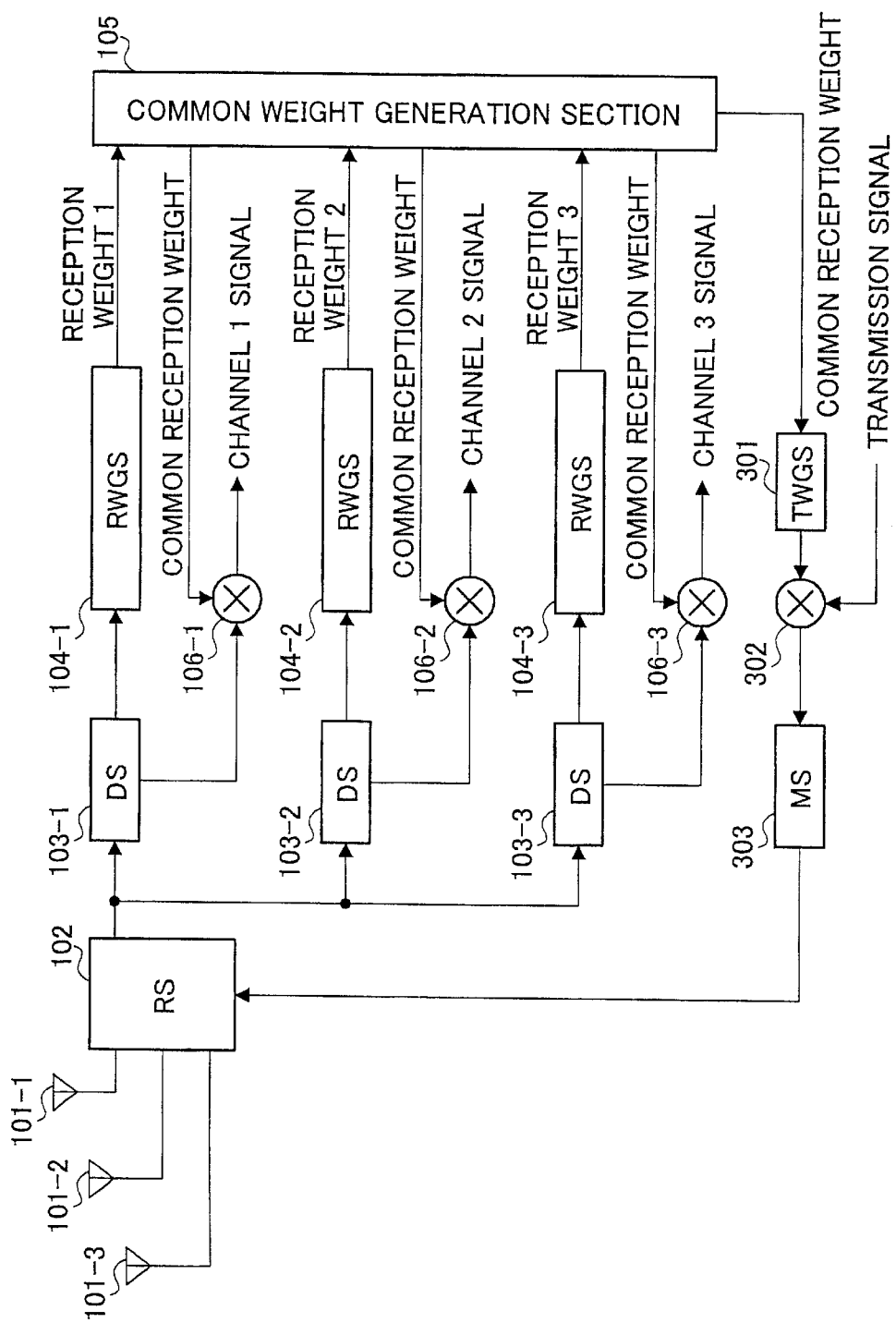
FIG. 3 is a block diagram showing a schematic configuration of an array antenna radio communication apparatus according to a third embodiment of the present invention.

FIG. 3 is a block diagram showing a schematic configuration of an array antenna radio communication apparatus according to the third embodiment of the present invention. Here, parts similar to those of the first embodiment are denoted by the same reference numbers, and detailed description will be eliminated.

A transmission weight generation section(TWGS) 301 generates a transmission weight from the common reception weight, considering difference in transmitting and receiving frequencies.

A multiplier 302 multiplies a transmission signal by the transmission weight. A modulation section(MS) 303 performs predetermined modulation processing of the transmission signal by multiplying the transmission signal by a spreading code. A radio section(RS) 102 transmits the modulated transmission signal through antennas 101-1 through 101-3.

Then, operations of the array antenna radio communication apparatus with the above configuration will be described.

The common reception weight generated in a common weight generation section 105 is output to the transmission weight generation section(TWGS) 301. In the transmission weight generation section(TWGS) 301, a transmission weight is generated from the common reception weight and then the transmission weight is output to the multiplier 302. In the multiplier 302, the transmission weight is multiplied by the transmission signal. Thereby, the transmission signal is transmitted through antennas 101-1 through 101-3 under a state where a directional pattern corresponding to the transmission signal is formed.

Thus, according to the array antenna radio communication apparatus and the array antenna radio communication method, since the transmission weight is generated using the common reception weight, it is possible to transmit the transmission signal with an accurate directional pattern. Thereby, it is possible to reduce the interference given to other communication partners, other than a desired communication partner.

Here, the above third embodiment may be executed by combination with the above second embodiment.

And, cases, where one communication partner performs multi-code transmission of three signals spread with different spreading codes 1 through 3 on channels 1 through 3, have been described in the description of the above first through third embodiments. That is, a case, where the signal transmitted from one communication partner is multiplexed according to the CDMA method, has been described. However, the array antenna radio communication apparatus and the array antenna radio communication method according to the above first through third embodiments may be applied for a mobile communication system where signals of a plurality of channels are multiplexed not only by the CDMA method, but also by other methods such as a TDMA (Time Division Multiple Access) method, and a FDMA (Frequency Division Multiple Access) method.

Moreover, all reception weights for each signal transmitted from each communication partner naturally have the same value, when a plurality of communication partners are located in the same direction. Therefore, it is possible by a similar method to the above first through third embodiments to set all the reception weights for each signal transmitted from each communication partner to the common reception weight, when the array antenna radio communication apparatus according to the above first through third embodiments may estimate by using, for example, a GPS (Global Positioning System) that a plurality of communication partners are located in the same direction.

As described above, it is possible to improve the reception quality by setting values of the reception weights for a plurality of signals transmitted from the same direction on a plurality of channels to the same value.

This application is based on Japanese Patent Application No. 2000-049853 filed on Feb. 25, 2000, entire content of which is expressly incorporated by reference herein.

INDUSTRIAL APPLICABILITY

The present invention is applied to a mobile station apparatus and a base station apparatus used for a mobile communication system.

What is claimed is:

1. An array antenna radio communication apparatus comprising:
    an array antenna, which comprises a plurality of antenna elements, that receives signals transmitted on a plurality of channels from the same direction;
    a first generator that generates first reception weight factors for the respective signals of the channels;
    a second generator that generates a second reception weight factor, which is commonly used to multiply each of the respective signals of the channels, from the first reception weight factors generated in said first generator; and
    a multiplier that multiplies each of the respective signals of the channels by the second reception weight factor, wherein:
        all of the respective signals of the channels are received with the same directional pattern.

2. The array antenna radio communication apparatus according to claim 1, wherein
    said array antenna receives the signals transmitted on the plurality of channels from one communication partner.

3. The array antenna radio communication apparatus according to claim 1, wherein
    said second generator combines the first reception weight factors generated in said first generator to generate the second reception weight factor.

4. The array antenna radio communication apparatus according to claim 3, further comprising:
    a measurer that measures the reception qualities of the respective signals of the channels, wherein:
        said second generator combines the first reception weight factors after weighting of the first reception weight factors according to the reception qualities.

5. The array antenna radio communication apparatus according to claim 1, further comprising:
    a measurer that measures the reception qualities of the respective signals of the channels, wherein:
        said second generator uses the one of the first reception weight factors, which is generated for one of said signals with the best reception quality, as the second reception weight factor.

6. The array antenna radio communication apparatus according to claim 1, further comprising:
    a third generator that generates a transmission weight factor, from the second reception weight factor, for multiplying transmission signals.

7. A mobile station apparatus equipped with an array antenna radio communication apparatus,
    said array antenna radio communication apparatus comprising:
    an array antenna, which comprises a plurality of antenna elements, that receives signals transmitted on a plurality of channels from the same direction;
    a first generator that generates first reception weight factors for the respective signals of the channels;
    a second generator that generates a second reception weight factor, which is commonly used to multiply of each of the respective signals of the channels, from the first reception weight factors generated in said first generator; and
    a multiplier that multiplies each of the respective signals of the channels by the second reception weight factor, wherein:
        all of the respective signals of the channels are received with the same directional pattern.

8. A base station apparatus equipped with an array antenna radio communication apparatus, said array antenna radio communication apparatus comprising:
    an array antenna, which comprises a plurality of antenna elements, that receives signals transmitted on a plurality of channels from the same direction;
    a first generator that generates first reception weight factors for the respective signals of the channels;
    a second generator that generates a second reception weight factor, which is commonly used to multiply each of the respective signals of the channels, from the first reception weight factors generated in said first generator; and
    a multiplier that multiplies each of the respective signals of the channels by the second reception weight factor, wherein:
        all of the respective signals of the channels are received with the same directional pattern.

9. An array antenna radio communication method comprising:
    receiving signals transmitted on a plurality of channels from the same direction by an array antenna, which comprises a plurality of antenna elements;
    generating a second reception weight factor, which is commonly used to multiply each of the respective signals of the channels, from first reception weight factors for the respective signals of the channels;
    multiplying each of the respective signals of the channels by the second reception weight factor; and
    receiving all of the respective signals of the channels with the same directional pattern.

* * * * *